United States Patent [19]

Goodsmith

[11] Patent Number: 5,181,315
[45] Date of Patent: Jan. 26, 1993

[54] FASTENER INSTALLATION APPARATUS

[75] Inventor: Dale H. Goodsmith, Brighton, Mich.

[73] Assignee: Multifastener Corporation, Detroit, Mich.

[21] Appl. No.: 727,325

[22] Filed: Jul. 3, 1991

Related U.S. Application Data

[63] Continuation of Ser. No. 486,482, Feb. 28, 1990, abandoned.

[51] Int. Cl.$^5$ ............................................. B23P 19/00
[52] U.S. Cl. ........................................ 29/798; 29/716;
29/809; 29/281.1; 227/119; 227/123; 227/149
[58] Field of Search ................. 29/281.1, 281.3, 281.5,
29/809, 798, 714, 715, 716; 221/307; 227/55,
62, 119, 123, 155, 149; 72/465

[56] References Cited
U.S. PATENT DOCUMENTS

| 2,431,121 | 11/1947 | Hunter | 221/307 X |
| 3,926,356 | 12/1975 | Still | 227/149 X |
| 4,060,189 | 11/1977 | Vargo Jr. et al. | 227/62 X |
| 4,201,325 | 5/1980 | Jochum | 227/149 X |
| 4,555,838 | 12/1985 | Müller | 29/432.1 |
| 4,765,057 | 8/1988 | Müller | 29/716 |
| 4,819,856 | 4/1989 | Davern et al. | 227/149 X |
| 4,899,907 | 2/1990 | Benani | 29/809 X |

Primary Examiner—Mark Rosenbaum
Assistant Examiner—S. Thomas Hughes
Attorney, Agent, or Firm—Dykema Gossett

[57] ABSTRACT

An installation apparatus for use in attaching fasteners to a panel is provided having a magazine plate, plunger, fastener holder and retainer. The fastener holder is comprised of an elastically expanding body and includes generally inwardly sloping internal sidewalls defining a conically shaped passage therethrough and wall members which are slit therethrough. The installation apparatus is of particular use in fastener dispensing and installation devices which require the fastener to maintain a precise orientation during delivery and fastening.

21 Claims, 4 Drawing Sheets

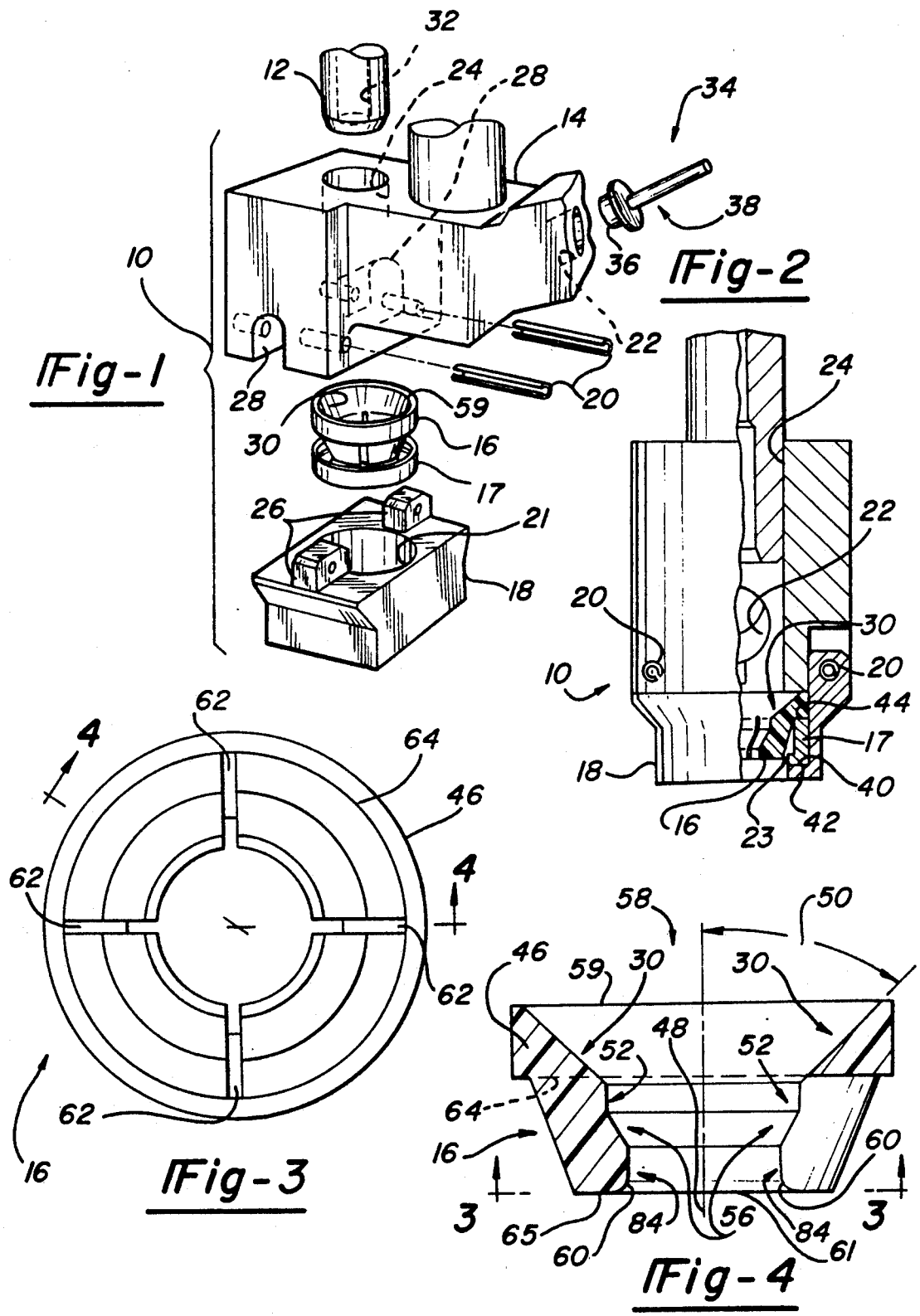

FASTENER INSTALLATION APPARATUS

This is a continuation of copending application Ser. No. 07/486,482 filed on Feb. 28, 1990, now abandoned.

TECHNICAL FIELD

The present invention relates generally to devices used in the installation of fasteners and more specifically relates to fastener installation apparatuses which must operate in a high volume capacity.

Fastener installation apparatuses which must operate in a high volume environment are generally known in the art. For example, U.S. Pat. No. 4,765,057 issued to Muller on Aug. 23, 1988 discloses a fastener installation apparatus FIGS. 15 through 26) for installing self-piercing and riveting fasteners of the type disclosed in U.S. Pat. No. 4,555,838. U.S. Pat. No. 4,555,838 (hereinafter '838) and U.S. Pat. No. 4,765,057 (hereinafter '057) are hereby incorporated by reference.

Although the fastener installation apparatus disclosed in the '057 patent functions satisfactorily in the majority of applications, certain deficiencies were evidenced during its operation. The majority of these deficiencies focus upon a portion of the fastener apparatus which is responsible for orienting fasteners prior to and during their installation. This portion of the installation apparatus responsible for orienting the fasteners is generally called the nose assembly and more specifically relates to the portion of the nose assembly which is comprised of slide members 306, springs 308, screws 309 and snap rings 310 (see U.S. Pat. No. '057, FIGS. 15, 16, 18 and 19).

The focus of the difficulties with the prior art nose assembly center upon two spaced slide members 306 each having a conical opening or recess 304. The two spaced slide members are inwardly biased by way of spring 308. When a fastener 300 is delivered between the conical opening 304 of the two spaced slide members 306, the conical opening acts to center the fastener 300 thereby properly orienting it for installation. Installation is achieved by the prior art apparatus by engaging a plunger 260 with the fastener 300 and forcing the fastener through the conical opening of the two spaced slide members. As the fastener is being forced through the conical opening by the plunger, slide members are urged outwardly by the fastener as it passes through the conical opening.

One of the shortcomings of the prior art nose assembly was that the cumbersome nature of the nose assembly mechanism 254 prevented its use on panels which were not substantially flat in the immediate area where the fastener was to be installed. This shortcoming was mainly due to the space required by the 53 pieces of the nose assembly. Thus, in applications where the fastener had to be inserted in a deep depression which was surrounded by closely spaced sidewalls, the '057 apparatus could not be used because of the access space required by the nose assembly. This drawback proved to be of major significance inasmuch as many automotive panels consist of highly irregular contours and accordingly, could not be used in cooperation with the fastener installation apparatus disclosed in the '057 patent.

A second problem which became evident in the slide member portion of the nose assembly was its susceptibility to failure in the environment in which it is predominantly used. More specifically, because the installation apparatus is mainly used to install self-piercing type fasteners in a production environment, metal chips, grease, dirt and other abrasives eventually found their way between the moving parts of the nose assembly, particularly the parts surrounding the two spaced slide members. These contaminants affected the vertical movement of the slide members which in turn affected their ability to properly orient the fasteners during the time in which the plunger pushed the fasteners through the conical opening. The inability of the spaced slide members to apply uniform pressure to the fastener as it passed through the conical opening, caused the fastener to cock as it travelled through the conical opening. When the fastener exited the conical opening in a cocked or improper orientation, it would enter the panel improperly and accordingly be fastened to the panel improperly. Moreover, depending upon the extremity of the misalignment, opportunity was presented for much damage to be done to the underlying die button or nose assembly.

Accordingly, it is a primary object of the present invention to provide an apparatus for installing fasteners which has an improved nose assembly.

Another object of the present invention is to provide an apparatus for automatically dispensing fasteners in an orientation which facilitates their attachment to a panel.

It is still a further object of the present invention to provide a device for properly orienting self-attaching fasteners so that their assembly orientation onto a panel is predictable.

Still another object of the present invention is to provide a nose assembly for metering the passage of self-attaching fasteners in a way to prevent damage to the nose assembly, underlying die button and associated panel.

SUMMARY OF THE INVENTION

In light of the foregoing objects, the present invention provides an installation apparatus for attaching fasteners to a panel, each fastener including a barrel portion at one end and a generally coaxially extending body portion, the installation apparatus including: a base member, a nose member spaced apart from and movable with respect to the base member, the nose member including a first passage for receiving a fastener and communicating with a transverse plunger passage, a plunger having a free end movable with the base member, the free end adapted to be received through the plunger passage for driving one of the fasteners therethrough, the plunger free end having internal sidewalls defining a bore and a bore opening therein to receive the body portion of the fastener, the panel located adjacent to the plunger passage, a fastener holder disposed between the plunger passage and the panel, the holder having generally inwardly sloping internal sidewalls defining a conically shaped passage therethrough, the passage walls forming a first and second opening in the holder, the first opening adapted to receive the barrel portion end of a fastener from the plunger passage, the conically shaped passage adapted to center and support a fastener for installation to the panel, wherein upon receipt of a fastener within the conically shaped passage of the holder, the nose member moves relative to the plunger causing the plunger bore to receive the fastener body, thereby insuring accurate orientation and alignment of the fastener for installation, and actuating means for actuating the apparatus to move the plunger through the plunger passage, the plunger moving the fastener through the conically shaped passage of the fastener holder, and causing the fastener to exit from the holder through the second opening of the holder whereby the fastener contacts the panel.

In a preferred embodiment, the generally inwardly sloping internal sidewalls of the holder blend into generally downwardly sloping internal sidewalls, wherein the generally downwardly sloping internal sidewalls define in combination an internal cylindrical surface adapted to receive the barrel portion of a fastener.

The second opening of the holder is preferably smaller than the first holder opening and the holder sidewalls are preferably radially elastic thereby acting to hold a fastener in its proper orientation as the plunger pushes it through the fastener holder. Preferably the holder is constructed from a single plastic member and wherein the cup sidewalls are slit therethrough, the slits beginning at said second opening and extending into the holder sidewalls towards the first opening. In a preferred embodiment, the holder is constructed from urethane and the construction of the holder includes casting the holder from liquid urethane. In a preferred embodiment, the first passage of the nose member defines an obtuse angle with said transverse plunger passage wherein the fasteners drop into the plunger passage from the first passage and the apparatus includes a transfer means for transferring the fasteners one at a time through the first passage into the conically shaped passage of the holder, the inwardly sloping walls of the holder acting to orient the fasteners for installation and the head portion of the fastener adapted to be received and oriented in the conically shaped surface of the holder.

The base member is preferably attached to a movable platen of a press and the base and nose members are operably interconnected by a piston means, the piston means adapted to move the nose member relative to the base member causing the plunger bore to receive the body portion of the fastener, the actuating means operating the press platen thereby closing the space between the plunger and the panel, thereby driving the fastener through the holder passage and placing the fastener in contact with the panel.

In its most preferred embodiment, the apparatus includes sensing means extending through the plunger bore to engage the fastener body and sense the propriety of the fasteners orientation in the holder, the sensing means operably connected to the actuating means to cause the plunger to move through the plunger passage when the fastener is properly oriented in the holder as determined by the sensing means.

These features, together with other objects and advantages which will become subsequently apparent, reside in the details of construction and operation as more fully hereinafter are described and claimed.

BRIEF DESCRIPTION OF THE DRAWINGS

FIG. 1 is a partial exploded view of the installation apparatus of the present invention.

FIG. 2 is a partial sectional view of the nose portion of the present invention.

FIG. 3 is a bottom view of the fastener holder taken substantially along lines 3—3 of FIG. 4.

FIG. 4 is a sectional view of the fastener holder taken substantially along lines 4—4 of FIG. 3.

DETAILED DESCRIPTION OF THE PREFERRED EMBODIMENTS

Figure 5:
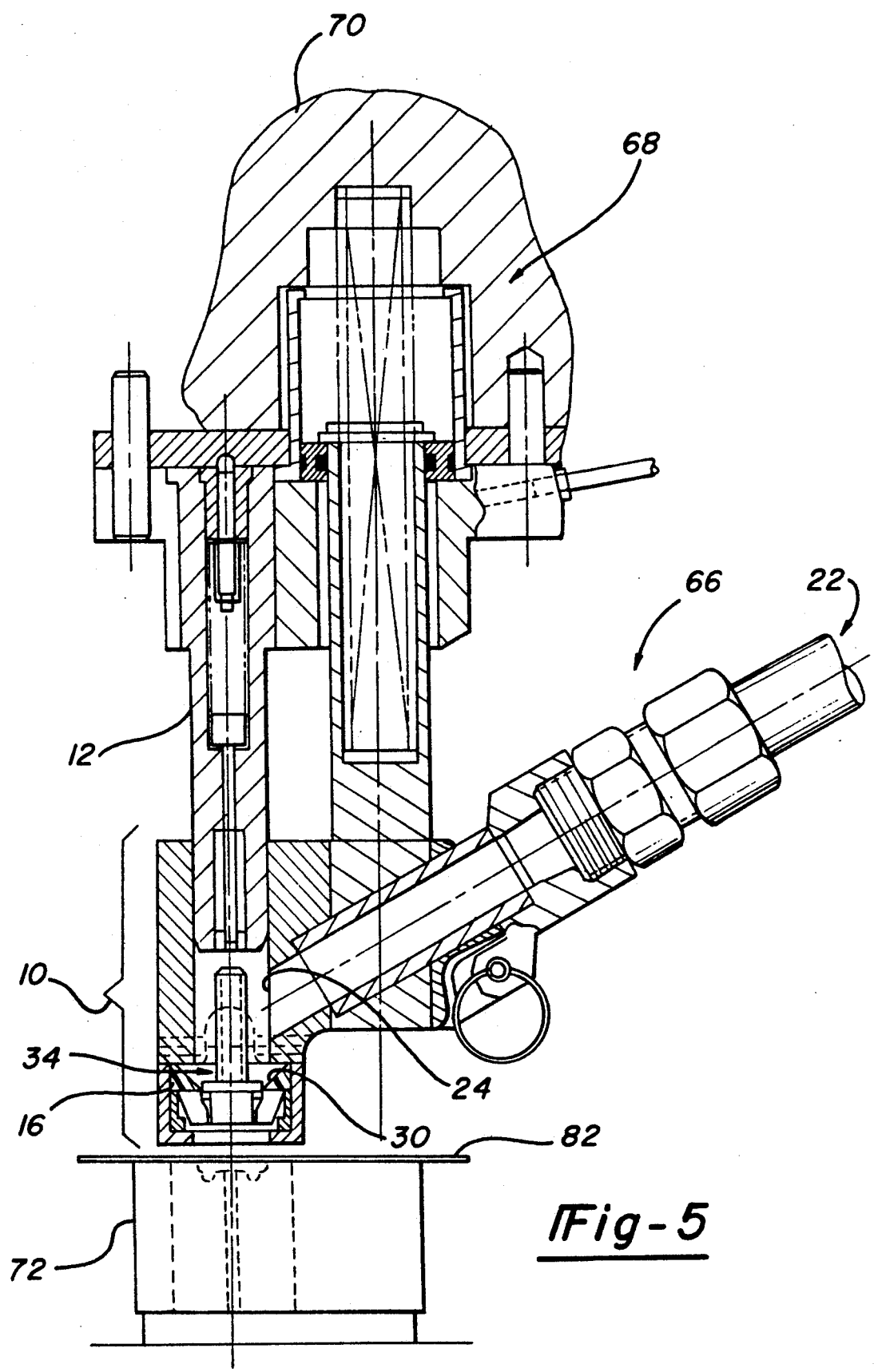
FIG. 5 is a partial sectional view of the installation apparatus of the present invention showing the nose portion in an open position.

As described above, the disclosed installation apparatus of this invention is particularly adapted for mass production applications, including those associated with automotive applications. The type of fasteners which are envisioned to be used in association with the disclosed installation apparatus are primarily those which are known as stud-type fasteners of the type disclosed in U.S. Pat. No. 4,555,838; however, the disclosed installation apparatus of the present invention is not limited to the configuration of the fastener disclosed in the '838 patent. Moreover, it is envisioned that thread mounted fasteners, adhesive mounted fasteners and even fasteners which are welded in place can all be utilized with the disclosed installation apparatus.

The preferred fastener to be used in the disclosed installation apparatus is the self-piercing and riveting fastener. This type of riveting fastener has a generally cylindrical head portion which is designed to permanently attach to a workpiece or panel, particularly a metal sheet or the like, such as is utilized by the automotive industry for body panels and component parts. Although the fastener element head portion is preferably cylindrical, other geometries may be employed such as polygonal, etc. As described in the above referenced '838 and '057 patents, the self-piercing fastener is particularly suited for use with the disclosed installation apparatus in conjunction with a conventional die press, such as is utilized by the automotive industry to form sheet metal parts, including body panels and structural components. In such applications, the die press installs one or more fastening elements with each stroke of the press, wherein the fastener element becomes a permanent part of the panel. As used herein, panel refers to any plate, panel or metal sheet. Self-piercing fasteners may be utilized in any application where rivits or weld fasteners are presently used, such as securing panels together. The apparatus of the present invention is particularly adapted for placing a fastener in its proper orientation and keeping the fastener properly oriented while delivering the fastener to the panel.

Now referring to the drawing of FIG. 1, nose assembly 10 is primarily responsible for properly orienting a fastener (or fastener element) 34 and delivering it to a panel (or workpiece not shown). Nose assembly 10 consists of magazine plate 14, fastener holder 16, fastener holder ring 17 and fastener holder retainer 18. Fastener holder 16 is adapted to be received within fastener holder ring 17. Fastener holder retainer 18 has an internal bore 21 which is adapted to receive and retain fastener holder 16 and fastener holder ring 17. Fastener holder retainer 18 has two ears 26 which are adapted to be receive within channel 28 and pinned therein by roll pins 20.

Fastener 34 is delivered to nose assembly 10 via first passage (or feed passage) 22. These fasteners are delivered one at a time through a delivery system (not shown). Fastener 34 is delivered through first passage 22 and travels down first passage 22 by way of an urging force. This urging force can be pressurized air, gravity or some combination of the two. Fastener 34 is delivered along passage 22 intersecting transverse plunger passage 24, thereby causing it to drop through first opening 59 and into the generally inwardly sloping internal surface 30 of fastener holder 16. After the fastener is received between surface 30, a piston assembly (not shown) moves the entire nose assembly 10 upwardly thereby causing plunger 12 to be received within transverse plunger passage 24. As the mechanism continues to move nose assembly 10 upwardly the body portion 38 of fastener 34 is received within plunger bore 32. The relative movement between nose assembly 10 and plunger 12 causes the fastener head or barrel 36 to be received within generally inwardly sloping internal surface 30 of fastener holder 16. Because holder 16 is composed of elastic or preferably resilient material, its walls easily deform radially outwardly thereby gripping and centering fastener 34 within transverse plunger passage 32. In the final step of maneuvering fastener 34, plunger 12 moves through (or reciprocates within) transverse plunger passage 24 thereby pushing fastener 34 out through the second opening (or exit opening) 61 of fastener holder 16 (second opening not visible) and onto an adjacent panel (or workpiece not shown).

Now referring to the drawing of FIG. 2, nose assembly 10 receives fastener 34 (not shown) through first passage 22. First passage 22 is generally downwardly sloping so as to use gravity in the assisting fastener 34 in its decent. After traversing first passage 22, fastener 34 begins a downward descent by virtue of it entering transverse plunger passage 24. The downward descent of fastener 34 is halted once fastener head or barrel 36 contacts generally inwardly sloping internal surface 30 of fastener holder 16. Fastener holder ring 17 is supported along its bottom surface 40 by ledge 42 of retainer 18. Holder 16 is supported within fastener holder retainer 18 by being supported about its peripheral shoulder 44 by holder ring 17. Holder ring 17 has an internal step 23 to lend additional support to holder 16 when it performs its centering function. Fastener holder retainer 18 is pinned to magazine plate 14 by virtue of roll pins 20.

Now referring to the drawing of FIG. 3 and FIG. 4, fastener holder 16 is comprised of a holder body sidewalls 46 having generally inwardly sloping internal surface 30. In the preferred embodiment of the present invention, holder 16 is unitary and its surface 30 slopes at an approximate angle of 45 degrees with respect to axial line 48 (slope shown at reference number 50). The preferred slope 50 of surface 30 may vary depending upon the contour of fastener head 36, overall fastener geometry, the composition material of fastener 34 and other variables. Inwardly sloping surface 30 generally forms a conically shaped passage (or opening) 58 which is adapted to center and support fastener 34 in preparation of dispensing fastener 34 onto a panel. Inwardly sloping surface 30 preferably blend into generally downwardly sloping internal surface 52. Holder 16 is fashioned from material which is radially elastic and resilient, thereby allowing downwardly sloping surfaces 52 to radially expand around fastener head 36 thereby griping and orienting fastener 34 so that it is coaxially aligned with axial line 48 of fastener holder 16.

As fastener head 36 passes beyond generally downwardly sloping internal surfaces 52, a second set of generally inwardly sloping internal surfaces 56 contact the fastener head 36. Second set of sloping surfaces 56 generally restrict conical passage 58 even greater than the restriction presented by generally downwardly sloping surfaces 52 and accordingly, exert a greater centering force on fastener 34 than experienced between downwardly sloping surfaces 52. This greater intensity of force acts to assure fastener 34 will be maintained along center line 48 as it traverses conical passage 58. Rim 60 of holder body 46 is curved or chamfered to permit gradual transfer of fastener 34 from conical passage 58 and onto panel (not shown).

Holder body 46 preferably includes slits 62 which are cut radially through the holder body sidewalls 46. The slits 62 preferably begin in the area where inwardly sloping surface 30 blend into downwardly sloping surfaces 52 (shown at reference number 64), and continue through the holder body sidewalls 46 thereby exiting the bottom end 65 of holder body 46. Slits 62 aid body sidewalls 46 in elastically expanding about fastener head 36 throughout the duration in which fastener 34 is pushed through conical passage 58 by plunger 12. Without the inclusion of slits 62 there may be some tendency of fastener head 36 to gouge or tear sidewalls 46 especially along surface 56. Accordingly, slits 62 allow sidewalls 46 to apply ample pressure to fastener 34 without unduly restricting its passage through conical passage 58.

Many different materials may be used in the construction of fastener holder 16, the primary requirement being that the material be elastic enough to permit passage of fastener 34 through conical passage 58 while still providing sufficient inward urging to keep fastener 34 coaxially aligned with axial line 48. The material is preferably resilient to recover its original shape following each installation. In the preferred embodiment of the present invention, urethane plastic having a durometer of 60 A rendered good results.

By constructing nose assembly 10 as shown in FIG. 1, much simplification was introduced into the nose assembly design over that nose design previously disclosed in the '057 patent. This simplification evidenced itself in the elimination of approximately 27 parts from the '057 design and also resulted in a wider range of applications in which nose assembly 10 could be used because the reduction of parts allowed for its reduction in size and accordingly it can easily access irregular panel contours which the prior art design could not.

Now referring to the drawing of FIG. 5, nose assembly 10 is shown in the type of environment in which it is preferably used. This environment typically includes chute system 66, piston assembly 68, die press platen 70, plunger 12 and die 72. The female die or die button 72 is generally located and secured in the opposite or lower die platen (not shown) and panel 82 is secured to prevent relative movement between panel 82 and die button 72. Fastener 34 is deposited in chute system 66 by a metering apparatus (not shown). Fastener 34 progresses through chute system 66 via first passage 22. This progression can be caused by the introduction of various forces to fastener 34 such as gravity, pressurized air and the like. When fastener 34 completes its traversal of first passage 22 it is transferred to transverse plunger passage 24 by virtue of the communication which exists between first passage 22 and transverse plunger passage 24. Fastener 34 eventually comes to rest between inwardly sloping surface 30 of holder 16. This completes the loading of fastener 34 within nose assembly 10.

Figure 6:
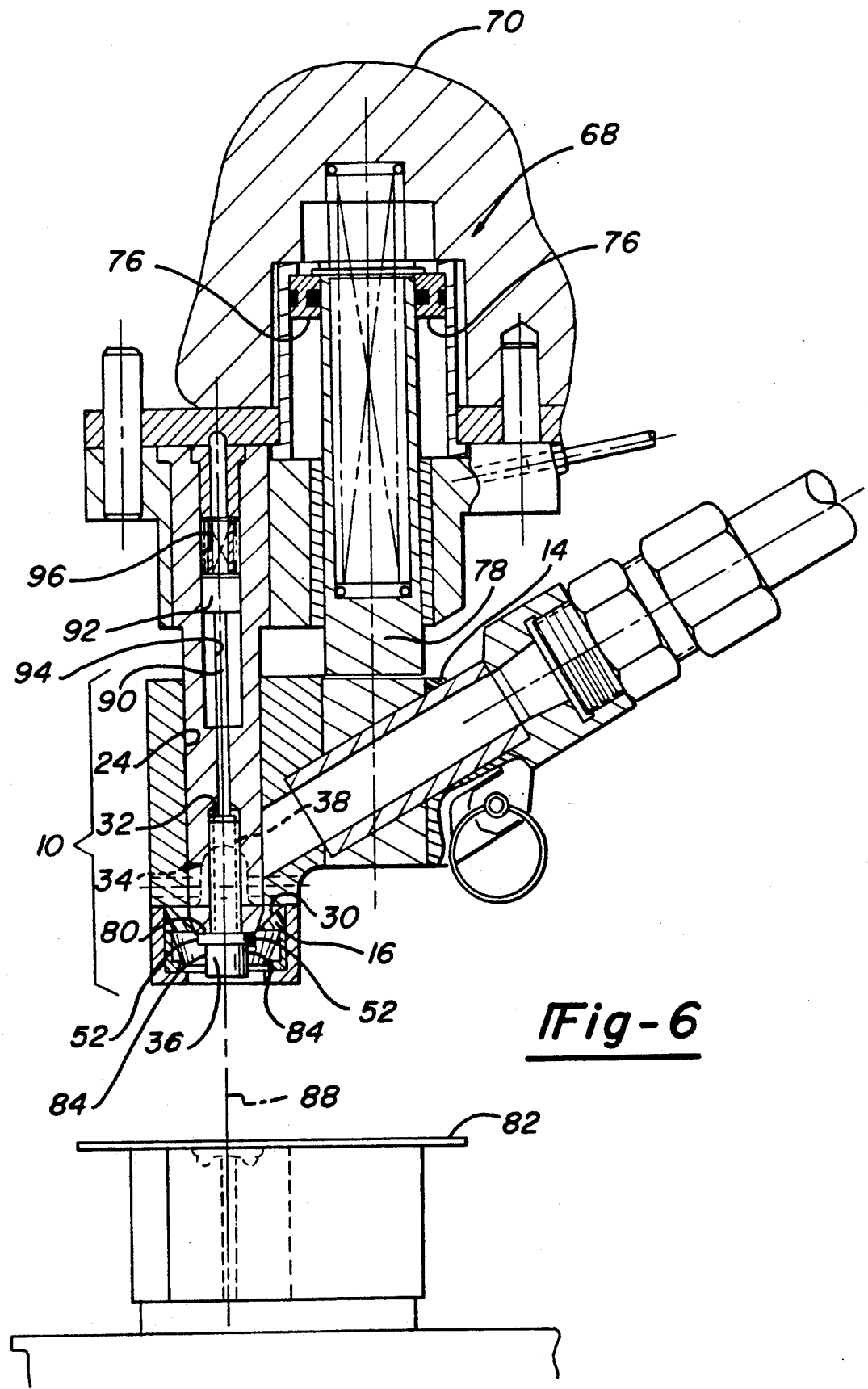
FIG. 6 is a partial cross-sectional view of the apparatus of the present invention showing the nose portion in a ready position.

Now referring to the drawing of FIG. 6, after fastener 34 is received between inwardly sloping surface 30 of fastener holder body 46, piston assembly 68 is activated by piston assembly activation means (not shown). When piston assembly 68 is activated piston head 76 is forced upwardly (by means of air pressure, hydraulic pressure or other forcing means) and assumes the position shown in FIG. 6. When piston head 76 is forced upwardly it pulls with it rod 78 and consequently, magazine plate 14 which is attached to rod 78. When magazine plate 14 moves upwardly it moves fastener 34 upwardly with it and causes the fastener body portion 38 to be received within plunger bore 32. Plunger bore bottom surface 80 forces the fastener head or barrel 36 to be engaged between downwardly sloping internal surfaces 52 of fastener holder 16. Because fastener holder 16 is preferably constructed from a resilient plastic, such as urethane or the like, holder 16 acts to orient fastener 34 properly in preparation for fastening it to panel 82. Proper orientation of fastener 34 is of the utmost importance in fastener installation apparatuses of this type, because even a small amount of misalignment can cause the fastener to jam in the nose assembly during assembly operation thereby destroying the nose assembly 10, die 72 or panel 82. Under extreme conditions, nose assembly 10 could even be so extremely damaged so as to crack or separate.

In addition to elastically retaining fastener 34 by virtue of downwardly sloping surfaces 52, fastener head 36 is supported along a second set of generally downwardly sloping internal surfaces 84. This second set of downwardly sloping surfaces 84 gives added support to the aligning forces supplied by the first set of downwardly sloping internal surfaces 52 and acts to guarantee the alignment of fastener 34 along dispensing axis 88. It is important to note, that the ability of holder 16 to align fastener 34 within transverse plunger passage 24 lies in great part to the fact that unlike the mechanical nose assembly of the '057 patent which relied upon sliding members and spring forces, holder 16 relies on its own inherent properties of elasticity to create the aligning forces.

This unique approach to the fastener alignment problem has eliminated, for all practical purposes, the handicapping effects of abrasives, tars and gums, and other contaminations which the nose assembly 10 is subject to in a normal production environment.

Figure 7:
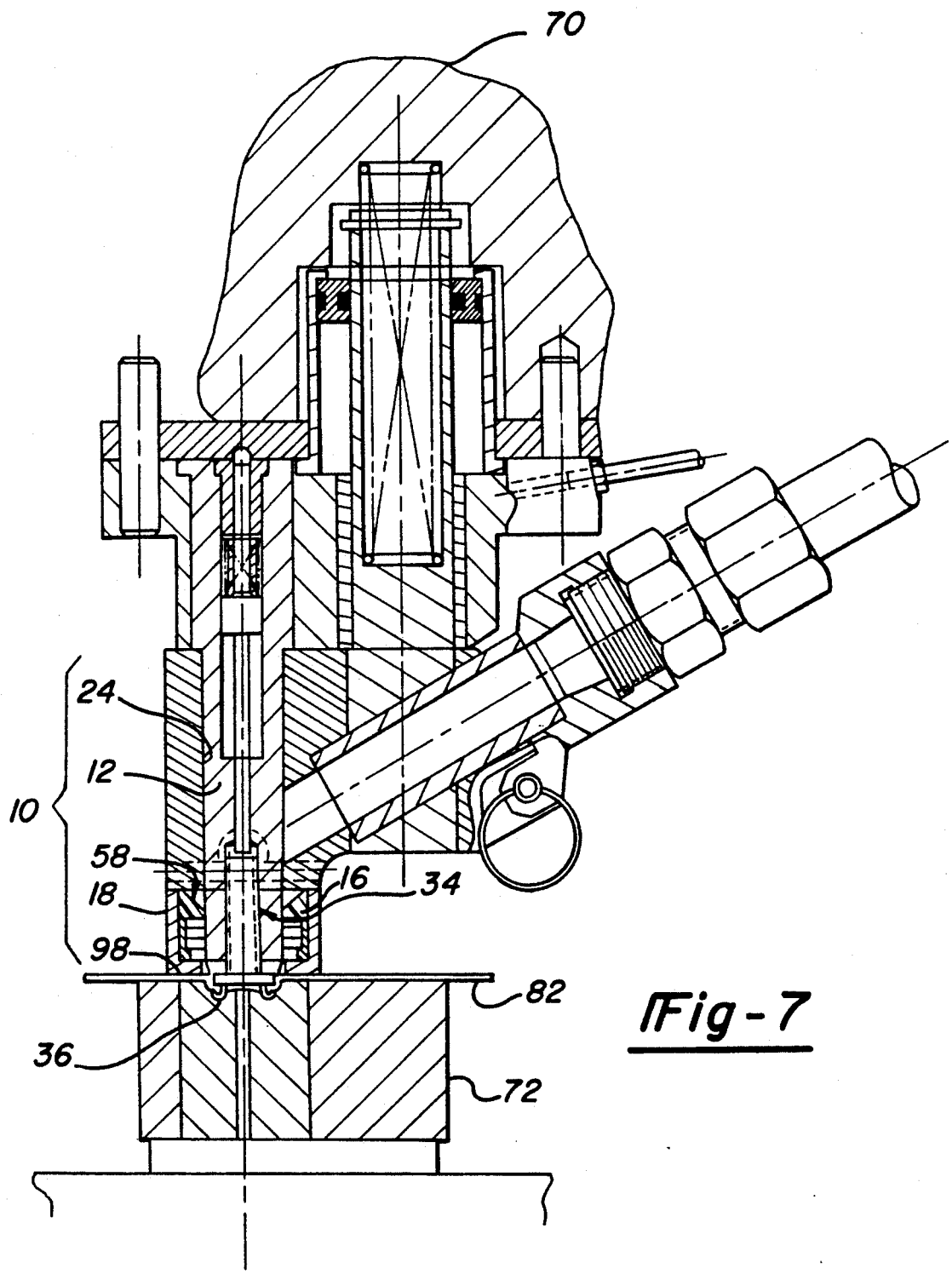
FIG. 7 is a partial cross-sectional view of the installation apparatus of the present invention showing the apparatus in a closed position.

It is preferred that a proximity detection means be utilized with the disclosed apparatus so that if fastener 34 should cock or otherwise become misaligned within transverse plunger passage 24, the press plate 70 would be prohibited from proceeding to the installation step of FIG. 7. This proximity means is partially comprised of rod 90 and rod head 92. Rod 90 is disposed within a second plunger bore 94. Second plunger bore 94 communicates with plunger bore 32 and allows rod 90 to contact the end of fastener body 38. Rod head 92 is adapted to be received within rod head bore 96 and travels therein as it follows rod 90. Proximity detected means (not shown) detects the relative position of rod head 92 and disables the movement press platen 70 if any misalignment between fastener 34 and transverse plunger passage 24 should occur. The final installation step of the disclosed apparatus will now be explained in conjunction with FIG. 7.

Now referring to the drawing of FIG. 7, upon receiving and enabling signal from proximity detector means (not shown) press platen 70 begins a downward descent relative to panel (or workpiece) 82 and die 72. Upon contact between the lower face 98 of fastener-holder retainer 18 and panel 82, nose assembly 10 is halted from any further downward movement by virtue of lower face 98 contacting panel 82. As press platen 70 continues to drive downwardly, plunger 12 continues to travel downwardly within transverse plunger passage 24 thereby pushing fastener 34 through conical passage 58 of fastener holder 16. When fastener 34 is of the self-attaching type, plunger 12 provides sufficient downward force to cause fastener head 36 to penetrate panel 82 and enter die 72. Die 72 is adapted to properly deform fastener head 36 so as to cause it to grip panel 82. It is important to note that fastener holder 16 must accommodate the passage of plunger 12 through its conical passage 58. This means that the material used to construct fastener holder 16 must have the unique combination to be strong enough to present sufficient inward urging upon fastener 34 for the purposes of properly orienting it while being elastic enough so as to not tear or become premanently deformed by virtue of accommodating the passage of plunger 12. As was stated earlier, urethane of durometer 60A provided this unique combination of inwardly urging force and elasticity.

Having described the preferred installation apparatus of the present invention, it is understood that various modifications may be made within the purview of the appended claims. The dimensions of the holder, holder ring, and other nose assembly components will depend upon the particular application and fastener geometry. As described above, however, the installation apparatus of the present invention is particularly suitable for placement of fasteners onto a panel, and particularly suited for the permanent attachment of self-piercing and riveting type fasteners to relatively thin panels, such as those utilized for body and structural components in the automotive and appliance industries.

I claim:

1. An installation apparatus for installing fastening elements on a workpiece, said fastening elements each having a radially extending flange portion connected to a generally cylindrical head portion, said installation apparatus including a plunger passage, a plunger reciprocating through said plunger passage and a feed passage communicating with said plunger passage, said plunger passage adapted to receive said fastening elements beneath said plunger for installation on said workpiece by said plunger, the improvement comprising:

a fastening element holder formed from an elastic material, said holder located in said plunger passage and having an axial passage therethrough, said holder axial passage coaxially aligned with said plunger, said holder axial passage including an entrance opening proximate said plunger and an exit opening distal said plunger, and wherein said holder axial passage is further defined by means for coaxially aligning said fastener with said holder axial passage without influence from said plunger, said aligning means including a first and second surface, said first surface sloping radially inwardly and downwardly, said second surface being generally cylindrical and extending generally downwardly, said first surface extending between said entrance opening and said second surface, and wherein said axial passage formed by said generally cylindrical second surface has a dimension sufficiently large so as to allow said head portion of said fastening element to freely enter therein while opposing the free passage of said flange portion of said fastening element, whereby said first surface is adapted to receive said head portion of said fastener and said slope of said first surface is adapted to center said fastener head portion within said holder axial passage defined by said generally cylindrical surface, whereby said fastener head is adapted to freely drop therein in alignment with said plunger, and said elastic holder is adapted to resiliently spread radially to permit passage of said fastening element through said axial passage upon engagement of said plunger against said fastening element, said plunger being effective for driving said fastening element through said holder passage and into engagement with said workpiece.

2. The installation apparatus of claim 1, wherein said holder axial passage is further defined by a third surface disposed between said second surface and said exit opening, said third surface sloping radially inwardly and downwardly.

3. The installation apparatus of claim 1, wherein said entrance opening of said fastening element holder is larger than the exit opening of said fastening element holder.

4. The installation apparatus of claim 3, wherein said fastening element holder is constructed from a single plastic member having a plurality of slits therethrough, said slits intersecting said exit opening and extending toward said entrance opening.

5. The installation apparatus of claim 4, wherein said holder is constructed from urethane, and the construction of said holder includes casting said holder from liquid urethane.

6. The installation apparatus of claim 1, wherein said feed passage defines an obtuse angle with said plunger passage wherein said fasteners drop into said plunger passage from said feed passage and said apparatus includes a transfer means for transferring said fasteners one at a time through said feed passage into said entrance opening of said holder.

7. The installation apparatus of claim 1, wherein said plunger includes a free end with a bore therein, said plunger attached to a movable platen of a press, and said plunger and holder operably interconnected by a piston means, said piston means adapted to move said holder relative to said plunger causing said plunger bore to receive said body portion of said fastener, wherein said press includes actuating means for actuating said press platen, thereby closing the space between said plunger and said panel, thereby driving said fastener through said holder passage and placing said fastener in contact with said panel.

8. The installation apparatus of claim 1, wherein said plunger includes a bore therein, and said apparatus further includes sensing means and actuating means, said sensing means extending through said plunger bore to engage said fastener body, for sensing the propriety of said fastener's orientation in said holder, said sensing means operably connected to said actuating means for relatively moving said plunger through said plunger passage when said fastener is properly oriented in said holder as determined by said sensing means.

9. An installation apparatus for installing fastening elements on a workpiece, said fastening elements each having a radially extending flange portion connected to a generally cylindrical head portion, said installation apparatus including a plunger passage, a plunger reciprocating through said plunger passage and a feed passage communicating with said plunger passage, said plunger passage adapted to receive said fastening elements beneath said plunger for installation on said workpiece by said plunger comprising:

a fastener holder formed from an elastic material, said holder located in said plunger passage between said plunger and said workpiece and having an axial passage therethrough, said holder axial passage coaxially aligned with said plunger, said holder axial passage including an entrance opening and an exit opening, said entrance opening proximate said plunger, and wherein said holder axial passage is further defined by means for coaxially aligning said fastener with said holder axial passage without influence from said plunger, said aligning means including a first and second surface, said first surface sloping radially inwardly and downwardly, said second surface being generally cylindrical and extending generally downwardly, said first surface extending between said entrance opening and said second surface, and wherein said axial passage formed by said generally cylindrical second surface has a dimension sufficiently large so as to allow said head portion of said fastening element to freely enter therein while opposing the free passage of said flange portion of said fastening element, whereby said first surface is adapted to receive said head portion of said fastener and said slope of said first surface is adapted to direct said fastener head portion into said holder axial passage defined by said generally cylindrical surface, whereby said fastener head is adapted to freely drop therein in alignment with said plunger, and further including actuating means for actuating said apparatus to move said plunger through said plunger passage, said elastic holder adapted to resiliently spread radially to permit passage of said fastening element through said axial passage upon engagement of said plunger against said fastening element, said plunger being effective for driving said fastening element through said holder passage and into engagement with said workpiece.

10. The installation apparatus of claim 9, wherein said holder axial passage is further defined by a third surface disposed between said second surface and said exit opening, said third surface sloping radially inwardly and downwardly, and wherein said entrance opening of said fastening element holder is larger than the exit opening of said fastening element holder.

11. The installation apparatus of claim 10, wherein said fastening element holder is constructed from a single plastic member having a plurality of slits therethrough, said slits intersecting said exit opening and extending toward said entrance opening.

12. The installation apparatus of claim 11, wherein said holder is constructed from urethane, and the construction of said holder includes casting said holder from liquid urethane.

13. The installation apparatus of claim 9, wherein said feed passage defines an obtuse angle with said transverse plunger passage wherein said fasteners drop into said plunger passage from said feed passage and said apparatus includes a transfer means for transferring said fasteners one at a time through said feed passage into said entrance opening of said holder.

14. The installation apparatus of claim 9, wherein said plunger includes a free end with a bore therein, said plunger attached to a movable platen of a press, and wherein said plunger and said holder members are operably interconnected by a piston means, said piston means adapted to move upwardly said holder member toward said base member causing said plunger bore to receive said body portion of said fastener, wherein said press includes actuating means for actuating said press platen, thereby closing the space between said plunger and said panel, thereby driving said fastener through said holder passage and placing said fastener in contact with said panel and wherein said apparatus includes sensing means, extending through said plunger bore to engage said fastener body, for sensing the propriety of said fastener's orientation in said holder, said sensing means operably connected to said actuating means to relatively move said plunger through said plunger passage when said fastener is properly oriented in said holder as determined by said sensing means.

15. An installation apparatus for installing self-piercing and self-attaching fasteners into a panel, each fastener including a barrel portion, a generally coaxially extending body portion, and a radially extending flange portion intermediate said body portion and said barrel portion said installation apparatus including:

a base member;

a nose member spaced apart from and movable with respect to said base member, said nose member including a first passage for receiving said fasteners and communicating with a transverse plunger passage;

a plunger having a free end movable with said base member, said free end adapted to be received through said plunger passage for driving one of said fasteners therethrough and into said panel, said panel located adjacent to said plunger passage, said plunger free end having internal sidewalls defining a bore and a bore opening therein to receive said body portion of said fastener;

a holder formed from an elastic material, said holder disposed between said plunger passage and said panel, said holder having an axial passage therethrough coaxially aligned with said plunger, said axial passage defining an entrance and exit opening, said axial passage being further defined by means for coaxially aligning said fastener with said holder axial passage without influence from said plunger, said aligning means including first and second surfaces, said first surface sloping radially inwardly and downwardly, said second surface being generally cylindrical and extending generally downwardly, said first surface extending between said entrance opening and said second surface, and wherein said axial passage formed by said generally cylindrical second surface has a dimension sufficiently large so as to allow said barrel portion of said fastening element to freely enter therein while opposing the free passage of said flange portion of said fastening element, said entrance opening adapted to receive said barrel portion of said fastener from said plunger passage, said first surface adapted to center and support said fastener for installation into said panel, wherein upon receipt of said fastener within said first surface of said holder, said nose member moves relative to said plunger causing said plunger bore to receive said fastener body thereby ensuring accurate orientation and alignment of said fastener for installation; and actuating means for actuating said apparatus to move said plunger through said plunger passage, said plunger moving said fastener through said axial passage of said fastener holder and causing said fastener to exit from said holder through said exit opening of said holder, whereby said fastener pierces said panel.

16. The installation apparatus of claim 15, wherein said holder axial passage is further defined by a third surface disposed between said second surface and said exit opening, said third surface sloping radially inwardly and downwardly, and wherein said entrance opening of said fastening element holder is larger than the exit opening of said fastening element holder, and wherein said fastening element holder is constructed from a single plastic member having a plurality of slits therethrough, said slits intersecting said exit opening and extending toward said entrance opening.

17. The installation apparatus of claim 16, wherein said holder is constructed from urethane, and the construction of said holder includes casting said holder from liquid urethane.

18. The installation apparatus of claim 15, wherein said feed passage defines an obtuse angle with said transverse plunger passage wherein said fasteners drop into said plunger passage from said feed passage and said apparatus includes a transfer means for transferring said fasteners one at a time through said feed passage into said entrance opening of said holder.

19. The installation apparatus of claim 15, wherein said holder is constructed from a single plastic member and wherein said holder includes radial slits therethrough, said slits beginning at said second opening and extending into said holder toward said first opening.

20. The installation apparatus of claim 19, wherein said holder is constructed from urethane, and the construction of said holder includes casting said holder from liquid urethane, and wherein the durometer of said urethane is generally 60A.

21. The installation apparatus of claim 15, wherein said plunger includes a free end with a bore therein, said plunger attached to a movable platen of a press, and wherein said plunger and said holder members are operably interconnected by a piston means, said piston means adapted to move upwardly said holder member toward said base member causing said plunger bore to receive said body portion of said fastener, wherein said press includes actuating means for actuating said press platen, thereby closing the space between said plunger and said panel and driving said fastener through said holder passage and placing said fastener in contact with said panel and wherein said apparatus includes sensing means, extending through said plunger bore to engage said fastener body, for sensing the propriety of said fastener's orientation in said holder, said sensing means operably connected to said actuating means to relatively move said plunger through said plunger passage when said fastener is properly oriented in said holder as determined by said sensing means.

* * * * *